(12) United States Patent
Umeda

(10) Patent No.: US 7,574,673 B2
(45) Date of Patent: Aug. 11, 2009

(54) METHOD, APPARATUS AND RECORDING MEDIUM FOR SELECTING IMAGES AND MODIFYING IMAGES FOR PRINT ORDER STATUS VIA AN INFORMATION HANDLING SYSTEM

(75) Inventor: Tomoaki Umeda, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 92 days.

(21) Appl. No.: 10/085,125

(22) Filed: Mar. 1, 2002

(65) Prior Publication Data

US 2002/0126149 A1 Sep. 12, 2002

(30) Foreign Application Priority Data

Mar. 2, 2001 (JP) .............................. 2001-057568

(51) Int. Cl.
*G06F 3/00* (2006.01)
(52) U.S. Cl. ...................................... 715/838; 715/769
(58) Field of Classification Search ................. 715/838, 715/523, 716, 717, 769, 835, 837, 846, 733, 715/748, 750, 764, 810, 845, 500, 512, 527, 715/526, 530; 385/1.15; 348/207.2, 231.99, 348/231.2, 231.3, 231.4, 231.6; 358/1.15, 358/1.16, 1.17, 403, 402
See application file for complete search history.

(56) References Cited

U.S. PATENT DOCUMENTS

| | | | | |
|---|---|---|---|---|
| 5,666,215 A | * | 9/1997 | Fredlund et al. | ............. 358/487 |
| 5,963,204 A | * | 10/1999 | Ikeda et al. | .............. 715/835 X |
| 5,966,122 A | * | 10/1999 | Itoh | ............................ 715/838 |
| 5,983,236 A | * | 11/1999 | Yager et al. | ............... 707/104.1 |
| 6,282,362 B1 | * | 8/2001 | Murphy et al. | ......... 348/231.3 X |
| 6,369,908 B1 | * | 4/2002 | Frey et al. | ................... 358/1.15 |
| 6,515,765 B1 | * | 2/2003 | Umebayashi | ................ 358/1.9 |
| 6,633,413 B1 | * | 10/2003 | Schlank et al. | .............. 358/468 |
| 6,697,090 B1 | * | 2/2004 | Nagasaka et al. | ........... 715/769 |
| 6,744,529 B2 | * | 6/2004 | Winter et al. | ............... 358/1.15 |
| 6,784,925 B1 | * | 8/2004 | Tomat et al. | ........... 348/207.11 |
| 6,895,557 B1 | * | 5/2005 | Wood et al. | ............. 715/769 X |
| 6,950,198 B1 | * | 9/2005 | Berarducci et al. | ...... 358/1.15 X |
| 6,952,281 B1 | * | 10/2005 | Irons et al. | .................. 358/1.15 |
| 7,002,700 B1 | * | 2/2006 | Motamed | ................ 358/1.15 X |

(Continued)

FOREIGN PATENT DOCUMENTS

JP 8-106469 A 4/1996

(Continued)

OTHER PUBLICATIONS

K. Fukuda, "Exploring Free Software, Image Viewer Capable of Displaying Thumbnails", Nikkei Linux, vol. 1, No. 2, Feb. 2001, p. 126.

*Primary Examiner*—Steven P Sax
(74) *Attorney, Agent, or Firm*—Sughrue Mion, PLLC

(57) ABSTRACT

An Order icon is displayed on a user terminal and image data sets to be printed are registered by drag-and-drop operations for the image data sets onto the Order icon. By opening the Order icon, thumbnail images of the registered image data sets are displayed, and print sizes and quantities are input to generate order information. The order information is transferred to an order reception server together with the image data sets, and further transferred to a DPE store where the image data sets are printed.

28 Claims, 9 Drawing Sheets

U.S. PATENT DOCUMENTS

| | | |
|---|---|---|
| 7,006,952 B1 * | 2/2006 | Matsumoto et al. ............ 703/2 |
| 7,355,759 B1 | 4/2008 | Kokusho |
| 2002/0105658 A1 * | 8/2002 | Jackson et al. ............... 358/1.2 |
| 2002/0105665 A1 * | 8/2002 | Wasilewski et al. ........ 358/1.13 |
| 2004/0179115 A1 * | 9/2004 | Tomat et al. ............. 348/231.6 |
| 2005/0057668 A1 | 3/2005 | Kokusho |
| 2005/0083407 A1 | 4/2005 | Kokusho |
| 2005/0283741 A1 * | 12/2005 | Balabanovic et al. ....... 715/838 |

FOREIGN PATENT DOCUMENTS

| | | |
|---|---|---|
| JP | 11-282596 A | 10/1999 |
| JP | 2001-22734 A | 1/2001 |
| JP | 2001-042442 A | 2/2001 |

* cited by examiner

METHOD, APPARATUS AND RECORDING MEDIUM FOR SELECTING IMAGES AND MODIFYING IMAGES FOR PRINT ORDER STATUS VIA AN INFORMATION HANDLING SYSTEM

BACKGROUND OF THE INVENTION

1. Field of the Invention

The present invention relates to a data management method and a data management apparatus for managing data such as image data, audio data, and text-file data. The present invention also relates to a computer-readable recording medium storing a program to cause a computer to execute the data management method.

2. Description of the Related Art

There have been known digital photograph service systems for carrying out various kinds of digital photograph services such as storing photographs obtained by users in image servers by digitization of the photographs, recording the photographs in CD-Rs, printing images obtained by users with digital cameras, and receiving orders for additional prints. As one form of such digital photograph service systems, network photograph service systems have also been proposed. In a network photograph service system, print orders or the like are received via a network such as the Internet.

In such a network photograph service system, a user installs viewer software in his/her personal computer which acts as a user terminal for reproducing image data recorded in a CD-R or obtained with a digital camera. In order to place a print order for example, the user generates order information describing the content of the print order by using an ordering function built in to the viewer software, and transfers the order information and image data representing an image or images to be printed from the user terminal to an order reception server installed in an order reception center via a network such as the Internet. The order reception server transfers the image data and the order information to a print server installed in a laboratory or in a mini-laboratory of a DPE store. The print server carries out printing of the image data based on the order information in order to generate a print or prints (hereinafter referred to as the prints) such as additional prints, picture postcards, photo albums or the like.

The prints generated in the above manner are delivered to an agency specified by the user at the time of ordering the prints. The user visits the agency and receives the prints after paying a charge therefor. A desired store generally close to the place of residence or employment of the user is designated as the agency. The agency maybe the DPE store that has generated the prints.

The "order information" refers to information such as a processing number for specifying the content of a service (such as additional print generation or picture postcard generation), an image number for specifying a photograph (a file number of image data representing the photograph), a print size and a quantity of prints, quality of printing paper (such as glossy or non-glossy), thickness of the printing paper, the content of photographic processing, and trimming specification, for example. The order information may further include information regarding a name, an address, a zip code and a phone number of the user.

In the network photograph service system described above, when the user places the print order for ordinary prints while using the viewer software for example, the user selects images to be printed one by one and inputs the content of the print order such as a size and a quantity for each of the images. The user then accesses the order reception server and transfers the order information representing the content of the print order and the image data to be printed. Therefore, the user needs to repeat the same procedure described above (such as image selection, order-content input, and data transfer) for each of the images to be printed, which is troublesome for the user.

SUMMARY OF THE INVENTION

The present invention has been conceived based on consideration of the above circumstances. An object of the present invention is therefore to enable easy management of various types of data, such as image data, audio data, moving-image data, and text-file data.

Another object of the present invention is to ease operation for placing a print order regarding image data.

A data management method of the present invention comprises the steps of:

displaying on display means an icon corresponding to a data management unit with which data can be registered;

registering the data with the data management unit by carrying out a drag-and-drop operation for the data onto the icon; and carrying out simple output of the data registered with the data management unit to the display means by opening the icon.

The "data management unit" refers to a folder, a recording medium, and the like which the data can be registered with and managed in.

The "display means" refers to a monitor such as a CRT display or a liquid crystal display.

"Registering the data with the data management unit" refers to the case of storing the data themselves in the data management unit or to the case of storing in the data management unit a link to the data. The data management unit may be stored locally in a hard disc of a personal computer or in a server or the like connected to a personal computer via a network.

"Simple output" refers to outputting the data to the display means in a state where the registered data that are output can be recognized. More specifically, in the case where the registered data are image data, simple output refers to displaying a thumbnail image thereof. In the case where the registered data are moving-image data, simple output refers to displaying a still image representing a scene in the moving-image data. In the case of text-file data, a print preview maybe displayed as the simple output of the data. In the case of audio data, simple output refers to displaying a file name thereof on the display means so that a portion of the audio data (such as an introduction) can be reproduced by clicking on the file name, for example.

In the case where the data refers to a plurality of image data sets registered with the data management unit and the simple output refers to displaying thumbnail images of the image data sets, it is preferable for the data management method of the present invention to further comprise the steps of:

displaying on the display means an order screen for all the image data sets together with the thumbnail images;

receiving an input of the content of a print order for the image data sets; and generating order information representing the content of the print order for the image data sets.

A data management apparatus of the present invention comprises:

a data management unit with which data can be registered;

display means; and control means for displaying an icon corresponding to the data management unit on the display means, for registering the data with the data management unit by a drag-and-drop operation for the data onto the icon, and for carrying out simple output of the data that have been registered with the data management unit to the display means by opening the icon.

In the data management apparatus of the present invention, in the case where the data are image data, the simple output may refer to displaying a thumbnail image of the image data that have been registered with the data management unit.

In the case where a plurality of image data sets are registered with the data management unit, the control means preferably:

displays an order screen for all the image data sets together with thumbnail images of the image data sets;

receives an input of the content of a print order for the image data sets; and generates order information representing the content of the print order for the image data sets.

The data management method of the present invention may be provided as a program recorded in a computer-readable recording medium that causes a computer to execute the data management method.

According to the present invention, by the drag-and-drop operation for the data onto the icon corresponding to the data management unit, the data are registered with the data management unit. Furthermore, by opening the icon, the simple output of the data to the display means is carried out. Therefore, the data to be output can be selected easily and how the data are output can be easily confirmed.

Especially, in the case where the data are the image data and the simple output refers to displaying the thumbnail image thereof, the simple output of the thumbnail image can be carried out by the simple drag-and-drop operation for the image data onto the icon and by opening the icon thereafter. In this manner, the image data that have been registered can be confirmed easily.

In the case where the plurality of image data sets are registered, the order screen is displayed for all the image data sets together with the thumbnail images thereof, and the content of the print order is input in the screen to generate the order information for the image data sets. In this manner, image selection and order-content input can be carried out at one time for the image data sets used in the print order, and the print order for the image data sets can be placed easily.

DESCRIPTION OF THE PREFERRED EMBODIMENTS

Hereinafter, embodiments of the present invention will be explained with reference to the accompanying drawings.

Figure 1:
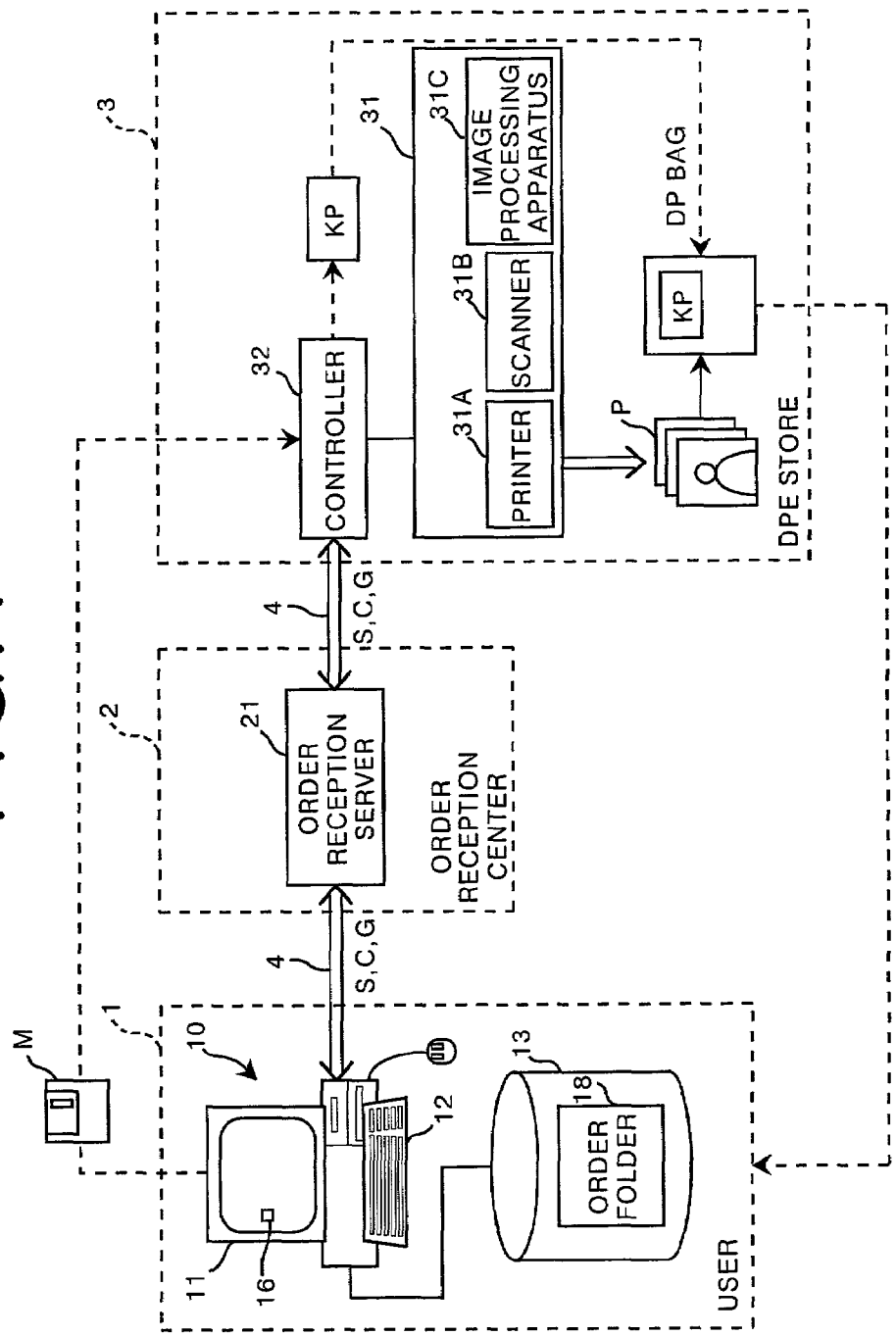
FIG. 1 is a block diagram showing a configuration of a print order system adopting a data management apparatus of an embodiment of the present invention.

FIG. 1 is a block diagram showing a configuration of a print order system adopting a data management apparatus of an embodiment of the present invention. The print order system is used for placing print orders regarding image data sets. As shown in FIG. 1, the print order system in this embodiment exchanges data and prints between users 1, an order reception center 2, and mini-laboratories (DPE stores) 3. Although multiple users 1 and DPE stores 3 are in reality connected to the order reception center 2, one of the DPE stores 3 and a user terminal 10 used by one of the users 1 (hereinafter referred to as the user 1) are shown in this embodiment for the sake of simplicity.

The user 1 has a personal computer acting as the user terminal 10, and the personal computer includes a monitor 11, input means 12 comprising a mouse and a keyboard, and a hard disc 13. The user terminal 10 can place a print order or print orders (hereinafter referred to as the print orders) from the order reception center 2 via a network 4 such as the Internet or a dedicated line. In the case where the user 1 does not have a personal computer, the user 1 can use an order terminal installed at a service provider as the user terminal 10.

A CD-R having viewer software recorded therein has been provided to the user 1, and the viewer software has functions of image display, and generation and transfer of order information C. The user 1 sets the CD-R in a CD-ROM drive (not shown) of the user terminal 10, and installs the viewer software in the user terminal 10. The viewer software enables the user 1 to browse through and manipulate image data sets S, to generate the order information C representing the content of the print orders regarding the image data sets S, and to place the print orders. At the time of placing the print orders, the user terminal 10 accesses the order reception center 2 according to the viewer software and transfers to the order reception center 2 the order information C and the image data sets S to be printed.

The order reception center 2 has an order reception server 21 for receiving the print orders. The order reception server 21 is always connected to the network 4 and receives the order information C and the image data sets S from the user terminal 10. The order reception server 21 selects one of the DPE stores 3 to carry out printing, based on the order information C. The order reception server then transfers the order information C and the image data sets S to be printed to the DPE store 3 that has been selected. The CD-R described above may be recorded with information for transferring the order information C to any specific one of the DPE stores 3 (such as a DPE store code, a laboratory code, a DP bag number, or a chain store code in the case of the DPE store 3 being a chain store) so that the information is accepted by the viewer software at the time of installation of the viewer software. In this case, the order information C can be transferred automatically from the user terminal 10 to the specific DPE store 3 without selection of the specific DPE store 3 by the order reception server 21.

Each of the DPE stores 3 has a digital mini-laboratory 31 for generating a print or prints P (hereinafter referred to as the prints P) based on the image data sets S transferred from the order reception server 21 of the order reception center 2 via the network 4, and a controller 32 for controlling the digital mini-laboratory 31.

The digital mini-laboratory 31 comprises a printer 31A for generating the prints P based on the image data sets S, a scanner 31B for scanning a negative film, and an image processing apparatus 31C for carrying out image processing on the image data sets S. The digital mini-laboratory 31 has a function of writing the image data sets S in a recording medium such as a CD-R.

The controller 32 has a personal computer and a printer. The controller 32 controls and manages the digital mini-laboratory 31, and is operated by an operator. The controller 32 outputs a sheet KP on which charges for the prints P, a name of the user 1, the content of the prints P, and an order ID assigned to the order information C are printed. By pasting the sheet KP on a DP bag containing the prints P, the prints P can be easily classified and the user 1 can be easily invoiced.

Figure 2:
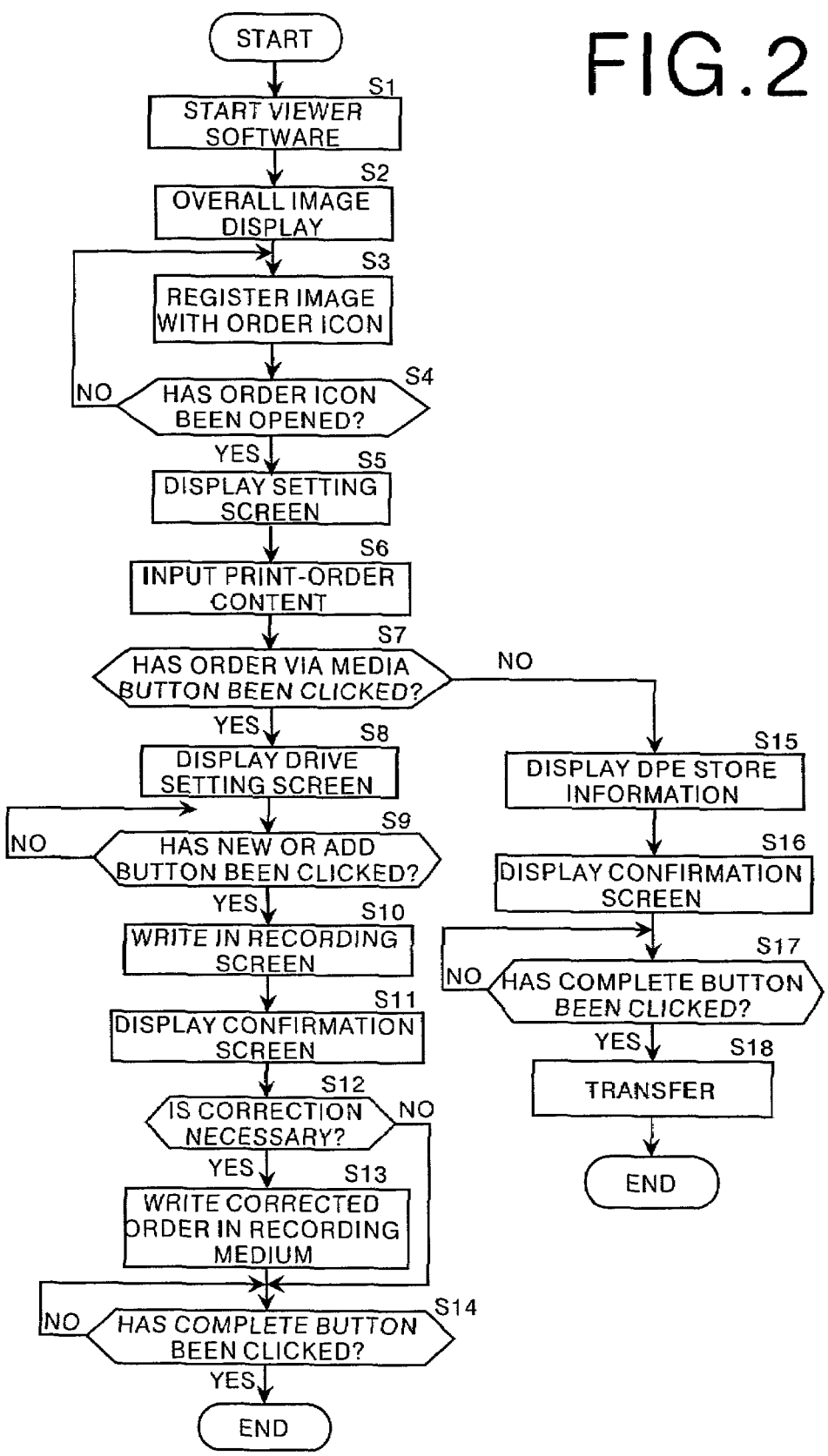
FIG. 2 is a flow chart showing operation of the embodiment.

Operation of this embodiment will be explained next. FIG. 2 is a flow chart showing a procedure carried out in this embodiment. In FIG. 2, the user 1 places the print orders for ordinary prints of selected ones of the image data sets S recorded in a CD-R (that is, prints generated by the printer 31A of the digital mini-laboratory 31) and for picture postcards of selected ones of composite image data sets G generated from the image data sets S and template data sets representing templates. The user terminal 10 has the viewer software installed therein.

The user 1 starts the viewer software (Step S1), and sets the CD-R recorded with the image data sets S in the CD-ROM drive of the user terminal 10. When the user 1 instructs overall image display to the viewer software, thumbnail images of the image data sets S recorded in the CD-R are displayed on the monitor 11 (Step S2).

Figure 3:
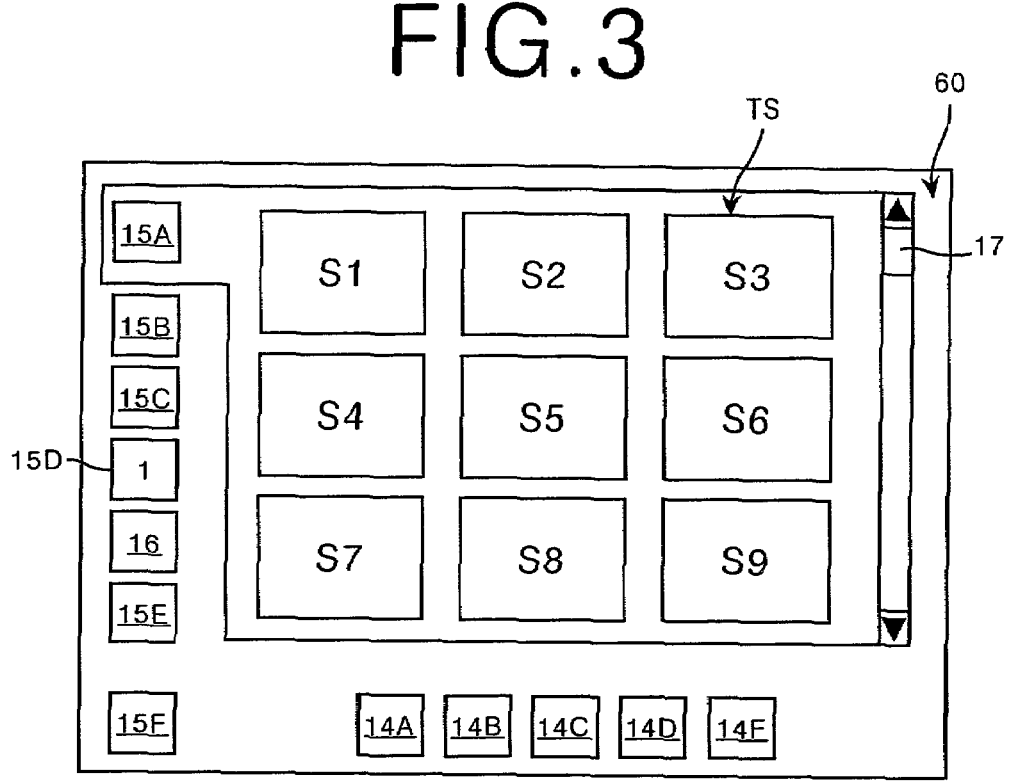
FIG. 3 shows an overall image display screen for ordinary prints.

FIG. 3 shows an overall image display screen 60 displayed on the monitor 11. As shown in FIG. 3, thumbnail images TS of the image data sets S in the CD-R are shown in the overall image display screen 60. A Slide Show button 14A for carrying out slide show of images represented by the image data sets S, an Image Manipulation button 14B for displaying a screen used for picture postcard generation, a Variety Print button 14C for displaying a screen used for variety print generation, an E-mail button 14D for transferring one or more of the images attached to an E-mail message, and an Index Print button 14E for displaying a screen for generating an index print are also shown below the thumbnail images TS. On the left of the thumbnail images TS are shown a Selection icon 15A for changing a film to be displayed, a Favorite icon 15B for favorite-image registration, an Album icon 15C for displaying thumbnail composite images generated from the image data sets S and the templates, a Quantity Display icon 15D for displaying the number of the thumbnail images TS that have been selected, a Trash icon 15E for image deletion, a Copy icon 15F for copying the image data sets S in an FD or the like, and an Order icon 16 for registering the image data sets to be printed. The image data sets S are recorded in directories for respective films from which the images were read. The film to be displayed refers to the film corresponding to the directory in which the image data sets S to be displayed are stored.

In FIG. 3, nine of the thumbnail images TS corresponding to nine of the image data sets S (hereinafter referred to as S1 to S9) are shown. However, more of the thumbnail images TS can be displayed by scrolling up and down the screen 60 with a scroll bar 17.

Figure 4:
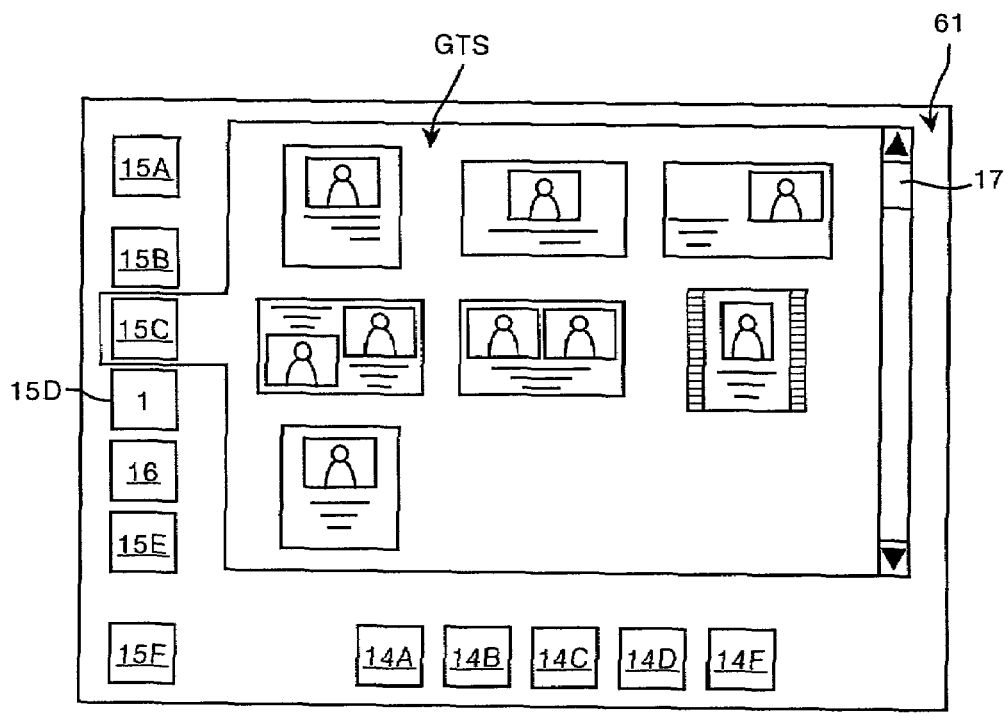
FIG. 4 shows an overall composite image display screen for picture postcards.

By opening the Album icon 15C, the thumbnail composite images of the composite image data sets G generated from the image data sets S and the template data sets are shown. FIG. 4 shows an overall composite image display screen. Thumbnail composite images GTS are shown in the overall composite image display screen 61, together with Slide Show button 14A, Image Manipulation button 14B, Variety Print button 14C, E-mail button 14D, Index Print button 14E, Selection icon 15A, Favorite icon 15B, Album icon 15C, Quantity Display icon 15D, Trash icon 15E, Copy icon 15F, and Order icon 16, as in the overall image display screen 60.

The overall composite image display screen 61 in FIG. 4 can be switched to the overall image display screen 60 in FIG. 3 by opening the Selection icon 15A, and vice versa by opening the Album icon 15C.

The user 1 registers the image data sets S to be printed with the Order icon 16 (Step S3) by dragging and dropping onto the Order icon 16 the corresponding thumbnail images TS selected in the overall image display screen 60 shown on the monitor 11. At this time, the thumbnail images TS of the image data sets S to be printed may be selected and dragged and dropped one by one or in a collective manner. The number of the thumbnail images TS that have been selected is then displayed in the Quantity Display icon 15D.

In the case of picture postcard generation, desired ones of the thumbnail images GTS shown in the overall composite image display screen 61 in FIG. 4 are dragged and dropped onto the Order icon 16.

In the overall image display screen 60 and in the overall composite image display screen 61, the content of the print orders is not confirmed. Therefore, the user 1 can temporarily register with the Order icon 16 the images which the user 1 has not determined to use for printing, or the images representing the same scene to choose from, for example. In this manner, the user 1 can later select the images for placing the print orders.

The Order icon 16 is linked to an Order folder 18 in the hard disc 13 of the user terminal 10. The image data sets S corresponding to the thumbnail images TS dragged and dropped onto the Order icon 16 are read from the CD-R and stored in the Order folder 18. Since the composite image data sets G have also been registered in this example, the composite image data sets G are also stored in the Order icon 16. Alternatively, the Order icon 16 may store only link information to the image data sets S corresponding to the registered thumbnail images TS and link information to the composite image data sets G corresponding to the registered thumbnail composite images GTS. In this case, the Order folder 18 actually stores neither the image data sets S nor the composite image data sets G. Instead, the Order folder 18 stores the link information representing where the image data sets S and the composite image data sets G are stored.

Whether or not the Order icon has been opened is then judged (Step S4) after registration of the image data sets S at Step S3. In the case where a result at Step S4 is negative, registration of the image data sets S to be printed is judged not completed. Therefore, the procedure returns to Step S3 for further registration of the thumbnail images TS. In the case where the result at Step S4 is affirmative, a setting screen for inputting the content of the order for the image data sets S that have been registered is displayed (Step S5). In this embodiment, three of the image data sets (S2, S4, and S9) are selected in the overall image display screen 60.

Figure 5:
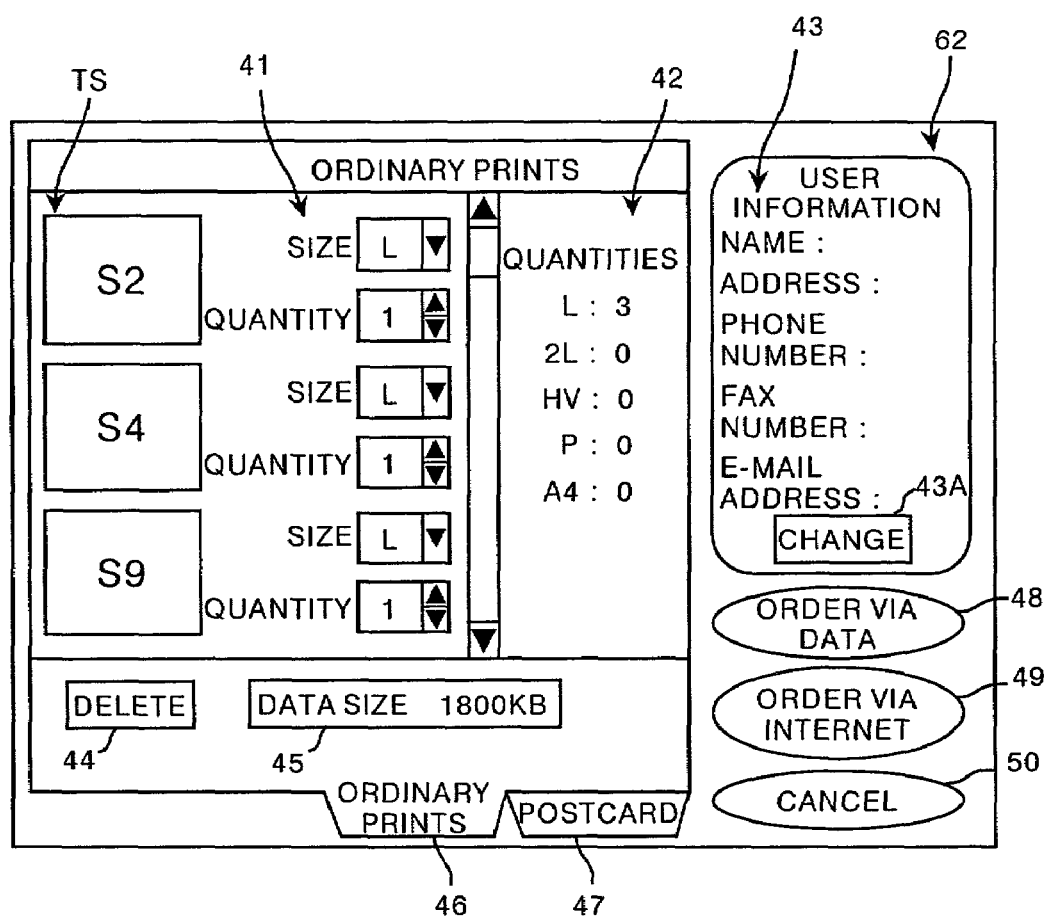
FIG. 5 shows a setting screen for ordinary prints.

FIG. 5 shows the setting screen for ordinary prints. In an ordinary print setting screen 62 in FIG. 5 are shown the thumbnail images TS of the image data sets S S2, S4, and S9 selected in the overall image display screen 60, input fields 41 for inputting print sizes and quantities, a quantity display field 42 for displaying the quantities for the respective print sizes, a user information display field 43 for displaying user information, a Delete button 44 for image cancellation, a data size display field 45 for displaying a total size of the image data sets S to be printed, an Ordinary Print tab 46 for displaying the ordinary print setting screen, a Postcard tab 47 for displaying a screen used for picture postcard generation, an Order via Media button 48 for placing the order via a recording medium, an Order via Internet button 49 for placing the order via the Internet, and a Cancel button 50 for returning to the overall image display screen 60. In the ordinary print setting screen 62, the thumbnail images TS are shown in reverse order of registration with the Order icon 16.

Figure 6:
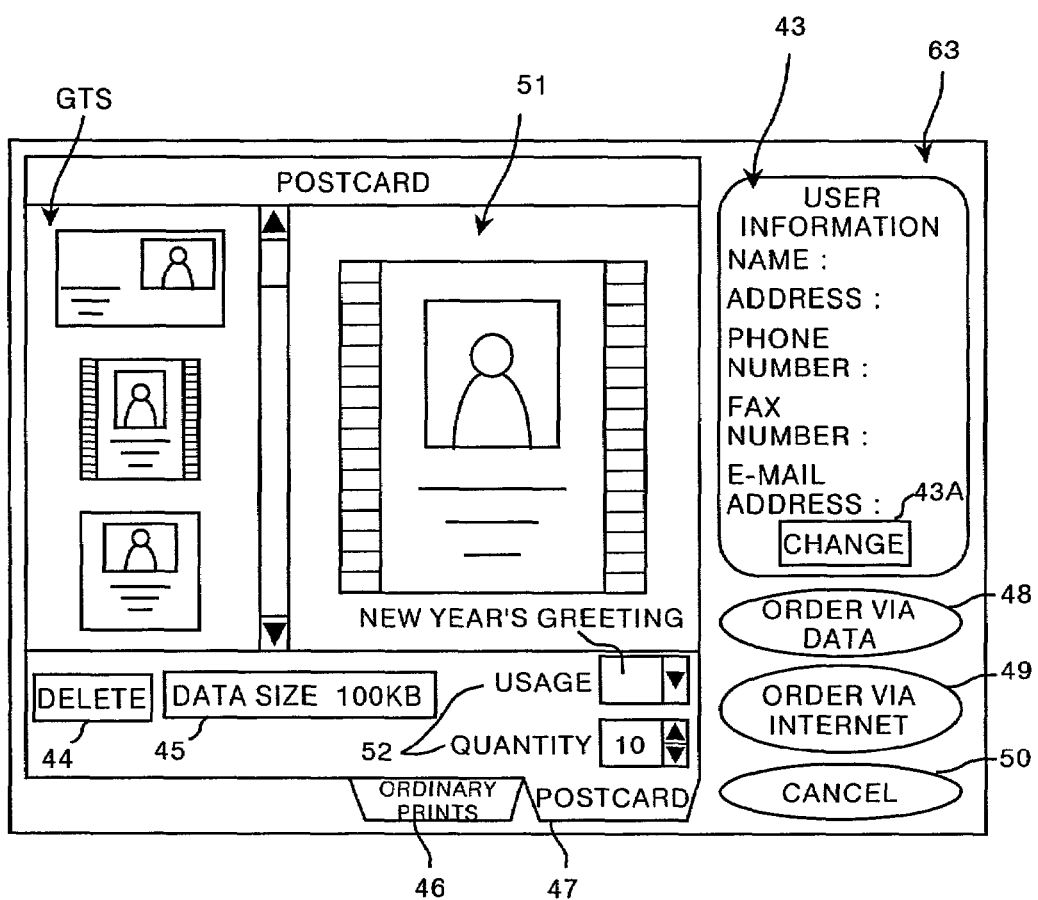
FIG. 6 shows a setting screen for picture postcards.

FIG. 6 shows a setting screen for picture postcard generation. In a picture postcard setting screen 63 in FIG. 6 are shown three of the thumbnail images GTS of the composite image data sets G selected in the overall composite image display screen 61 in FIG. 4 (G1, G2, and G3 in this embodiment), an enlargement display field 51 for displaying an enlargement of one of the thumbnail composite images GTS selected in the picture postcard setting screen, usage and quantity input fields 52 for inputting a usage and a quantity of the picture postcards to be generated from the thumbnail composite image being enlarged, a user information display field 43, a Delete button 44, a data size display field 45, an Ordinary Print tab 46, a Postcard tab 47, an Order via Media button 48, an Order via Internet button 49, and a Cancel button 50 for returning to the overall composite image display screen 61.

The picture postcard setting screen 63 shown in FIG. 6 can be switched to the ordinary print setting screen 62 shown in FIG. 5 by clicking the Ordinary Print tab 46, and vice versa by clicking the Postcard tab 47. Which of the setting screens 62 or 63 is displayed is determined by the image registered last with the Order icon 16 in the overall display screen 60 or 61. Therefore, if the image registered last is represented by one of the image data sets S in the overall image display screen 60 f or ordinary prints, the ordinary print setting screen 62 shown in FIG. 5 is displayed first. In the case where the image registered last is represented by one of the composite image data sets G in the overall composite image display screen 61 for picture postcards, the picture postcard setting screen 63 shown in FIG. 6 is displayed first.

The user 1 inputs the content of the print orders in the setting screens 62 and 63 (Step S6). The procedure of clicking on one of the thumbnail images TS and inputting the print size and the quantity thereof in the input fields 41 in the ordinary print setting screen 62 is repeated until the content of the print order for the image data sets S to be printed is all input. The print size can be selected from a pull-down menu for enabling an easy operation for inputting the print size. It is preferable for an aspect ratio of each of the thumbnail images TS to be changed in accordance with the print size input therefor. Meanwhile, for any of the images unnecessary for the print order, the corresponding thumbnail image is selected and the image data set S thereof is deleted by clicking the Delete button 44. The image data set S corresponding to the deleted image is also deleted from the Order icon 16.

In this manner, the quantities corresponding to the respective print sizes are shown in the quantity display fields 42, and the total data size for the image data sets S to be printed is shown in the data size field 45.

The name of the user 1 is shown in the user information display field 43, together with an address, a phone number, a fax number, and an E-mail address thereof. In an initial setting, the user information is not shown and needs to be input.

Furthermore, by clicking a Change button 43A in the user information display field 43, the user information can be changed.

By clicking the Cancel button 50, registration of the image data sets S or the composite image data sets G with the Order icon can be carried out again in the overall display screen 60 or 61.

Figure 7:
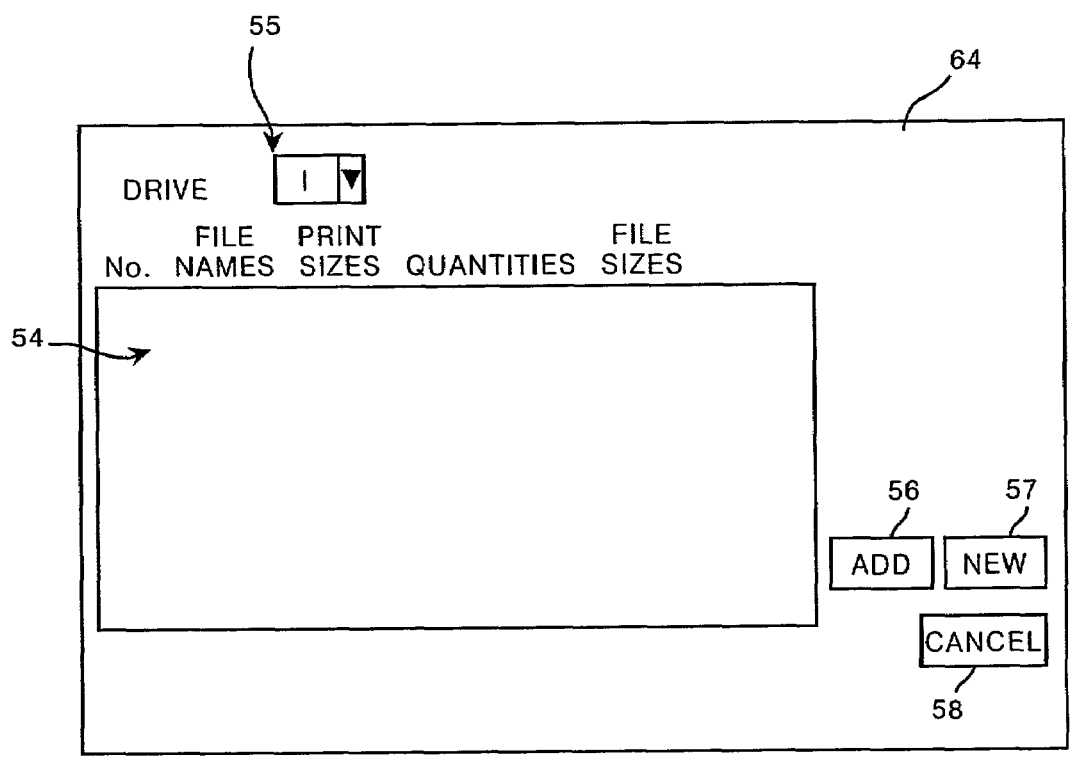
FIG. 7 shows a drive setting screen.

After the print sizes and the quantities are input for the image data sets S to be printed, the user 1 places the print order via a recording medium or via the Internet. In the case where the Order via Media button 48 has been clicked, a result at Step S7 becomes affirmative, and a drive setting screen 64 shown in FIG. 7 is displayed (Step S8). In the drive setting screen 64 are shown a data display field 54 for displaying data numbers (No.), file names, print sizes, and quantities of the image data sets S used for the print order, a drive selection field 55 for selecting a drive in which a recording medium M has been set, an Add button 56, a New button 57, and a Cancel button 58 for canceling writing order information C in the recording medium M. The drive selection field 55 comprises a pull-down menu. When a drive set with the recording medium M that is empty is selected in the drive selection field 55, nothing is displayed in the data display field 54. However, in the case where a drive set with the recording medium M recorded with previous image data sets S and previous order information C is selected, the content of a print order represented by the previous order information C recorded in the recording medium M is shown in the data display field 54.

By clicking the New button 57 or the Add button 56, a result at Step S9 becomes affirmative, and the image data sets S and the order information C are written in the recording medium M (Step S10). If the New button 57 is clicked in a state where the previous image data sets S and the previous order information C are still stored in the recording medium M, the previous image data sets S and the previous order information C are overwritten. If the Add button 56 is clicked in the same situation, the image data sets S and the order information C for the current print order are added to the previous image data sets S and the previous order information C. The order information C includes the file names, the print sizes, and the quantities of the image data sets S, and information (such as the name, the address, and the phone number) of the user 1.

Figure 8:
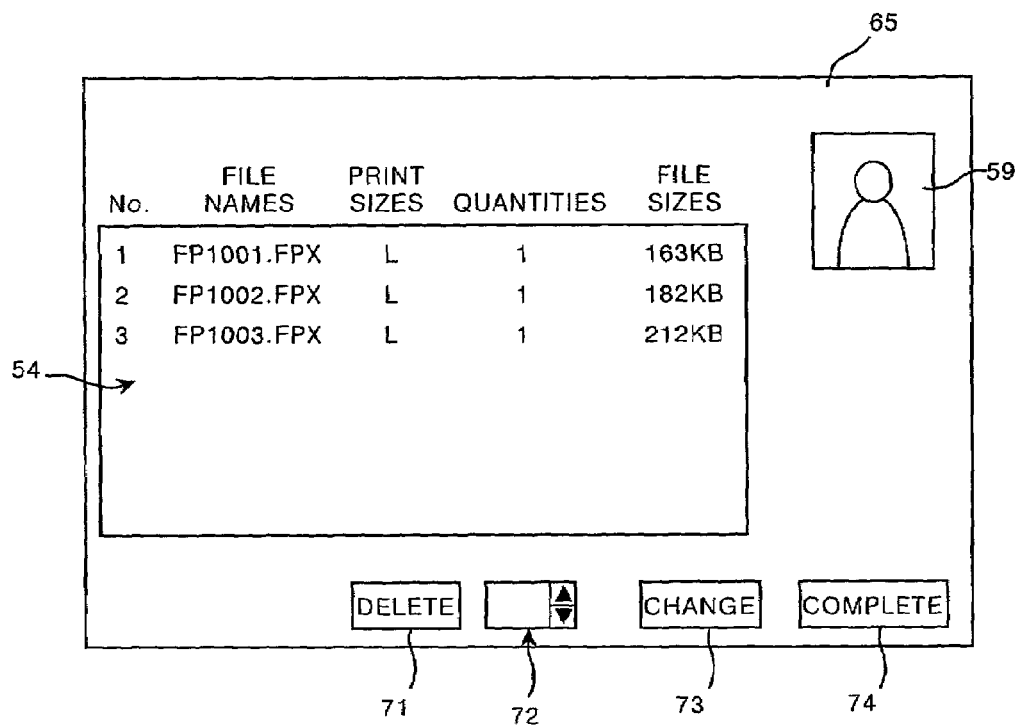
FIG. 8 shows a confirmation screen.

A confirmation screen for confirming the content of the print order input in the setting screen 62 is then displayed (Step S11). FIG. 8 shows a confirmation screen 65. In the confirmation screen 65 in FIG. 8 are shown a data display field 54, a thumbnail image field 59 for displaying one of the thumbnail images of the image data sets S selected from the data display field 54, a Delete button 71 for deleting one of the image data sets S selected from the data display field 54, a quantity change field 72 for changing one of the quantities, a Change button 73 for confirming the quantity that has been changed, and a Complete button 74 for completing description of the print order.

In the data display field 54, the content of the order input in the ordinary print setting screen 62 is displayed. If the Add button 65 is clicked in the case where the previous image data sets S and the previous order information C are still stored in the recording medium M, the content of the order input in the ordinary print setting screen 62 is added to previous order information C stored in the recording medium M.

When the user 1 selects any one of the image data sets S in the data display field 54, the corresponding thumbnail image of the selected image data set S is displayed in the thumbnail image display field 59. When the Delete button 71 is clicked in this state, the selected image data set S is eliminated from the content of the print order. When the quantity of the selected image data set S is changed in the quantity change field 72 and the Change button 73 is clicked thereafter, the quantity is changed. In the case where the image data set S is deleted or in the case where the quantity of the image data set S is changed, a result at Step S12 becomes affirmative, and the order information C after the change is written in the recording medium M (Step S13). When the Complete button 74 is clicked, a result at Step S14 becomes affirmative, and the procedure ends. If the result at Step S12 is negative, the procedure goes to Step S14.

Meanwhile, if the result at Step S7 is negative, that is, if the Order via Internet button 49 is clicked, a Web browser installed in the user terminal 10 is started and the user terminal 10 accesses the order reception server 21. The DPE stores 3 from which the user can place the print orders are then displayed on the monitor 11 (Step S15). In the case where the CD-R recorded with the viewer software has the information on the specific DPE store 3, the specific DPE store 3 is shown based on the information. The user 1 selects the DPE store 3 to place the print orders from, and the screen for confirming the content of the print order is displayed (in a Web browser screen, not in the confirmation screen 65) at Step S16. If a Complete button displayed in the Web browser screen is clicked, a result at Step S17 becomes affirmative. The image data sets S and the order information C are then transferred to the order reception server 21 of the order reception center 2 via the network 4 (Step S18), and the procedure ends.

In the case where the order is placed via the Internet, the order reception server 21 may transfer the order information C to the DPE stores 3 after reception of the order information C so that information of a charge per print and the time of delivery can be obtained for each of the DPE stores 3. In this manner, the user 1 can select the DPE store 3 to place the print order by viewing the information of the charge and the time of delivery displayed on the user terminal 10. As a result, the user 1 can request printing from the DPE store 3 charging less or processing faster.

In the case where the order is placed for picture postcard generation, a desired one of the thumbnail images GTS in the picture postcard setting screen 63 in FIG. 6 is clicked and the composite image thereof is displayed in the enlargement display field 51. In this state, the usage and the quantity of the picture postcards represented by the thumbnail image are input in the input fields 52. By clicking the Order via Media button 48 in the setting screen 63, the composite image data set G to be printed and the order information C are recorded in the recording medium M in the same manner as in Steps S8 to S14. Meanwhile, by clicking the Order via Internet button 49, the composite image data set G and the order information C are transferred to the order reception server 21 in the order reception center 2 via the network 4 as in Steps S15 to S18.

In the case of the print order for ordinary prints, the order reception server 21 receives the order information C and the image data sets S, and transfers the image data sets S and the order information C to the DPE store 3 to carry out printing. In the DPE store 3, the controller 32 receives the order information C, and prints an order reception sheet based on the order information C to notify the operator of the order reception. The operator generates the prints P according to the order information C.

Meanwhile, in the case where the order information C is recorded in the recording medium M, the user 1 brings the recording medium M to the DPE store 3 to place the print order.

In this case, the operator inputs the image data sets S and the order information C to the digital mini-laboratory 31 in the DPE store 3. The image data sets S are then printed as the prints P by the printer 31A of the digital mini-laboratory 31, based on the order information C. An order reception ID is printed on the backside of each of the prints P, and the prints P are sorted in the order described in the order information C. At the same time, the controller 32 prints the name of the user 1, the charges for the prints P, the content of the prints P, the order reception ID, and the like on the sheet KP. The sheet KP is pasted on the DP bag for the prints P, and the prints P having the order reception ID recorded thereon are put in the DP bag. The user 1 visits the DPE store 3 after the time of delivery, and receives the prints P by paying the charges. Alternatively, the prints P may be delivered to the user 1.

In the case of picture postcard generation, the digital mini-laboratory 31 also prints the picture postcards. The picture postcards are then subjected to image manipulation and provided to the user 1. In the case of picture postcard generation, the templates are copyrighted and used for the composite image data sets G. Therefore, a charge for using the template in any one of the composite image data sets G to be printed needs to be paid. The controller 32 therefore charges the user for the templates used in the composite image data sets G.

By storing information on the templates used for the composite image data sets G, user preference for the templates can be understood. In this manner, the user's favorite templates can be provided.

As has been described above, according to this embodiment, the image data sets S and the composite image data sets G to be printed are registered with the Order folder 18 by simply dragging and dropping the thumbnail images TS and the thumbnail composite image GTS onto the Order icon 16 in the overall image display screen 60 and in the overall composite image display screen 61. Therefore, the images to be printed can be easily selected. Furthermore, by opening the Order icon 16, the thumbnail images TS and the thumbnail composite images GTS to be printed are displayed. Therefore, the user 1 can easily confirm how the images will be printed. In the case where the number of the images to be printed is more than one, the user 1 does not repeat the whole procedure for each of the images. In this manner, the order can be placed easily.

Figure 9:
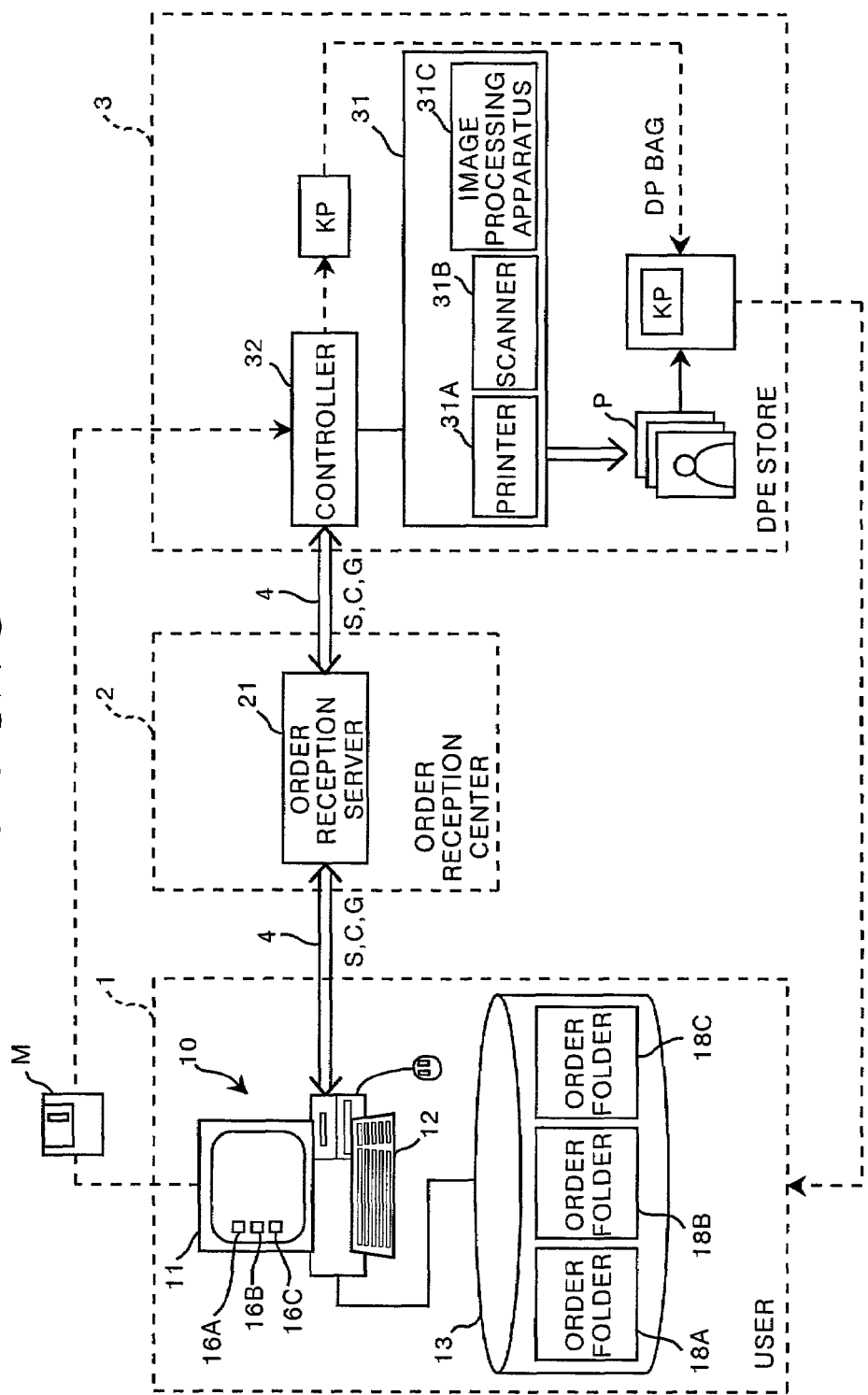
FIG. 9 is a block diagram showing a configuration of a print order system adopting a data management apparatus of another embodiment of the present invention.

In the above embodiment, only the Order icon 16 is displayed and the images dragged and dropped onto this icon are registered with the Order folder 18. However, as shown in FIG. 9, a plurality of Order icons 16A, 16B, and 16C may be displayed on the monitor 11. In this case, a plurality of Order folders 18A, 18B, and 18C corresponding to the Order icons are also used. By classifying the Order icons 16A to 16C such as My Order 1 icon, My Order 2 icon, and Other Order icon, the image data sets S and the composite image data sets G can be classified easily.

Figure 10:
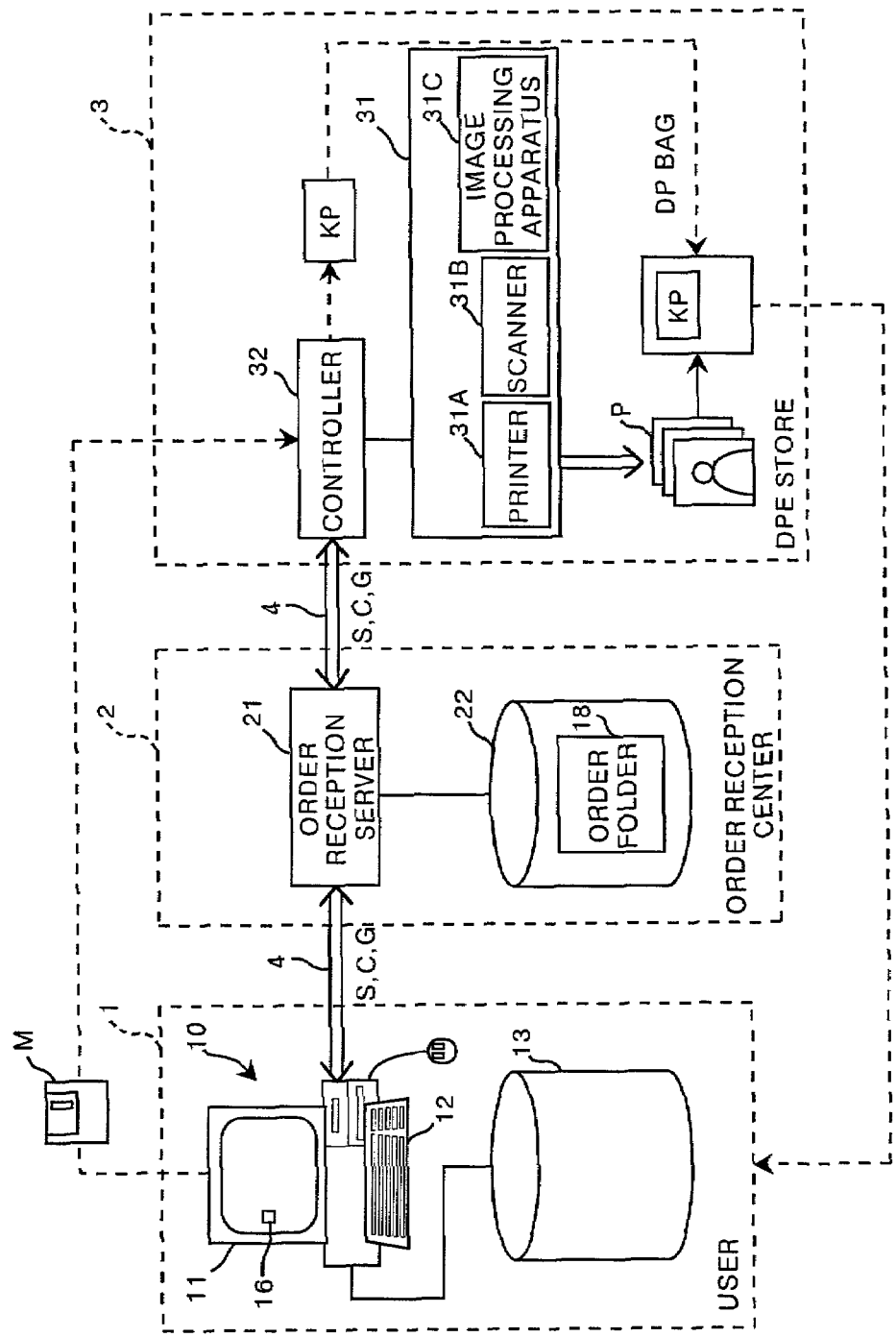
FIG. 10 is a block diagram showing a configuration of a print order system adopting a data management apparatus of still another embodiment of the present invention.

In the above embodiment, the Order folder 18 corresponding to the Order icon 16 is stored in the hard disc 13 of the user terminal 10. However, as shown in FIG. 10, the order reception server 21 of the order reception center 2 may have a hard disc 22 so that the Order folder 18 is stored in the hard disc 22. A plurality of Order icons may also be displayed on the monitor 11. In this case, a plurality of Order folders corresponding to the Order icons are stored in the hard disc 22.

In the above embodiment, the present invention is applied to the print order system for placing the print orders for printing the image data sets S and the composite image data sets G. However, the present invention may be applied to the case of placing an order for writing moving-image data sets or audio data sets in a large-capacity recording medium such as a CD-R or a DVD-R. In this case, the moving-image data sets and the audio data sets to be written are registered with the Order icon by drag-and drop operations for the data sets onto the Order icon. By opening the Order icon, scenes in the respective moving-image data sets are displayed so that the user can easily recognize the moving-image data sets to be written in the recording medium. In the case of audio data sets, file names thereof are displayed and a portion (such as an introduction) of each of the audio data sets is reproduced by clicking on the corresponding file name. In this manner, the user 1 can easily recognize the audio data sets to be written in the recording medium. In either case, an image to be printed on the CD-R or the DVD-R may also be selected.

In the above embodiment, the order reception server 21 in the order reception center 2 receives the image data sets S, the composite image data sets G, and the order information C, and transfers the image data sets and the order information to the DPE store 3. However, the DPE store 3 may install the order reception server 21 so that the order information C, the image data sets S, and the composite image data sets G are transferred directly from the user terminal 10 to the DPE store 3.

Furthermore, in the above embodiment, the present invention is applied to the case of placing the print orders. However, the present invention is applicable to the case of carrying out printing by a printer owned by the user 1. In other words, a Print icon is displayed instead of the Order icon, and the image data sets are registered with the Print icon by drag-and-drop operations for the image data sets S onto the Print icon. By opening the Print icon after the registration, thumbnail images of the image data sets are displayed. In this manner, the user 1 can easily recognize the images to be printed by the printer.

The present invention is applicable to not only multimedia data such as image data and moving-image data, but also document files, html files, and spread sheet data files, for example. In this case, the data are selected and registered with the Print icon. By opening the Print icon, a print preview screen of each of the files is displayed. In this manner, the user can easily recognize the files to be printed.

What is claimed is:

1. A data management method comprising:
    displaying on a display an icon corresponding to a data management unit;
    selecting data and registering the selected data with the data management unit by dragging-and-dropping the selected data onto the icon;
    carrying out a simple output of the data registered with the data management unit to the display by opening the icon, wherein said simple output indicates a content of an order for the data registered with the data management unit; and the data are image data and the simple output is displaying a thumbnail image or thumbnail images of the image data that have been registered with the data management unit;
    displaying input fields for inputting print quantities corresponding to the thumbnail image or the thumbnail images;
    displaying on the display, in the case where a plurality of sets of the image data have been registered with the data management unit, an order screen for all the image data sets together with the thumbnail images thereof;
    receiving an input of the content of a print order for the image data sets; and
    generating order information representing the content of the print order for the image data sets.

2. A data management apparatus comprising:
    a data management unit;
    a display; and
    a control circuit,
    wherein the control circuit displays an icon corresponding to the data management unit on the display, selects data and registers the selected data with the data management unit by dragging-and-dropping the data onto the icon, and carries out a simple output of the data registered with the data management unit to the display wherein the data are image data and the simple output is displaying a thumbnail image or thumbnail images of the image data that have been registered with the data management unit, and displays input fields for inputting print quantities corresponding to the thumbnail image or the thumbnail images;
    wherein the control circuit is configured to display on the display, in the case where a plurality of sets of the image data have been registered with the data management unit, an order screen for all the image data sets together with the thumbnail images thereof;
    wherein the control circuit is configured to receive an input of the content of a print order for the image data sets; and
    wherein the control circuit generates an order information representing the content of the print order for the image data sets.

3. A computer-readable recording storage medium for storing a program that causes a computer to execute a data management method, the method comprising:
    displaying on a display an icon corresponding to a data management unit;
    selecting data and registering the selected data with the data management unit by dragging-and-dropping the selected data onto the icon; and
    carrying out a simple output of the data that have been dragged-and-dropped onto the icon and registered with the data management unit to the display; and the data are image data and the simple output is displaying a thumbnail image or thumbnail images of the image data that have been registered with the data management unit;
    displaying input fields for inputting print quantities corresponding to the thumbnail image or the thumbnail images;
    displaying on the display, in the case where a plurality of sets of the image data have been registered with the data management unit, an order screen for all the image data sets together with the thumbnail images thereof;
    receiving an input of the content of a print order for the image data sets; and
    generating order information representing the content of the print order for the image data sets.

4. The data management method of claim 1, wherein a remote service provider is connected to the data management unit, the remote service provider providing services including storing image data, recording the image data on portable recording medium and printing image data.

5. The data management apparatus of claim 2, wherein a remote service provider is connected to the data management unit, the remote service provider providing services including storing image data, recording the image data on portable recording medium and printing image data.

6. The computer-readable recording storage medium for storing a program that causes a computer to execute a data management method of claim 3, wherein a remote service provider is connected to the data management unit, the remote service provider providing services including storing image data, recording the image data on portable recording medium and printing image data.

7. The data management method of claim 1, wherein the data includes image data, audio data, moving-image data and text-file data.

8. The data management apparatus of claim 2, wherein the data includes image data, audio data, moving-image data and text-file data.

9. The computer-readable recording storage medium for storing a program that causes a computer to execute a data management method of claim 3, wherein the data includes image data, audio data, moving-image data and text-file data.

10. The data management method of claim 7, wherein when the data is image data, the simple output is a display of a thumbnail image of the image data,
   wherein when the data is audio data, the simple output is a display of a link corresponding to the audio data that, when selected, plays a portion of the audio data,
   wherein when the data is moving-image data, the simple output is a display of a still image of a scene in the moving-image data, and
   wherein when the data is text-file data, the simple output is a print preview of the text file.

11. The data management apparatus of claim 8, wherein when the data is image data, the simple output is a display of a thumbnail image of the image data,
   wherein when the data is audio data, the simple output is a display of a link corresponding to the audio data that, when selected, plays a portion of the audio data,
   wherein when the data is moving-image data, the simple output is a display of a still image of a scene in the moving-image data, and
   wherein when the data is text-file data, the simple output is a print preview of the text file.

12. The computer-readable recording storage medium for storing a program that causes a computer to execute a data management method of claim 9, wherein when the data is image data, the simple output is a display of a thumbnail image of the image data,
   wherein when the data is audio data, the simple output is a display of a link corresponding to the audio data that, when selected, plays a portion of the audio data,
   wherein when the data is moving-image data, the simple output is a display of a still image of a scene in the moving-image data, and
   wherein when the data is text-file data, the simple output is a print preview of the text file.

13. The data management method of claim 1, wherein the data management unit stores the data or a link to the data.

14. The data management apparatus of claim 2, wherein the data management unit stores the data or a link to the data.

15. The computer-readable recording storage medium for storing a program that causes a computer to execute a data management method of claim 3, wherein the data management unit stores the data or a link to the data.

16. The data management method of claim 1, wherein a plurality of data is individually dragged-and-dropped onto the icon to register the plurality of data in the data management unit.

17. The data management apparatus of claim 2, wherein a plurality of data is individually dragged-and-dropped onto the icon to register the plurality of data in the data management unit.

18. The computer-readable recording storage medium for storing a program that causes a computer to execute a data management method of claim 3, wherein a plurality of data is individually dragged-and-dropped onto the icon to register the plurality of data in the data management unit.

19. The data management method of claim 16, wherein the data management unit stores the plurality of data or respective links to the plurality of data.

20. The data management apparatus of claim 17, wherein the data management unit stores the plurality of data or respective links to the plurality of data.

21. The computer-readable recording storage medium for storing a program that causes a computer to execute a data management method of claim 18, wherein the data management unit stores the plurality of data or respective links to the plurality of data.

22. An image display and ordering method, comprising:
   displaying on a display a display icon corresponding to a stored image data set;
   displaying on the display an order icon corresponding to an image data set selected for ordering;
   displaying on the display a simple image corresponding to an image in the stored image data set by opening the display icon;
   registering the image for ordering with the order icon by dragging-and-dropping the simple image onto the order icon; and a simple output is displaying the image;
   displaying input fields for inputting print quantities corresponding to the image; and performing image order processing of the registered image;
   displaying on the display, in the case where a plurality of sets of the image data have been registered with the data management unit, an order screen for all the image data sets together with the thumbnail images thereof;
   receiving an input of the content of a print order for the image data sets; and
   generating order information representing the content of the print order for the image data sets.

23. The image display and ordering method of claim 22, wherein the image order processing comprises:
   displaying a simple image of each registered image;
   requesting print order information corresponding to each registered image; and
   sending the print order information to a remote processing center via at least one of a recording medium and a network connection.

24. An image display and ordering apparatus, comprising:
   a display; and
   a control circuit,
   wherein the control circuit displays a display icon corresponding to a stored image data set and an order icon corresponding to an image data set selected for ordering,
   wherein the control circuit displays a simple image corresponding to an image in the stored image data set when the display icon is opened,
   wherein the control circuit registers the image for ordering with the order icon when the simple image is dragged-and-dropped onto the order icon, and displays a thumbnail image of the image registered with the data management unit through a simple output, displays input fields for inputting print quantities corresponding to the image or the thumbnail image; and performs image order processing of the registered image or images;
   wherein the control circuit is configured to display on the display, in the case where a plurality of sets of the image data have been registered with the data management unit, an order screen for all the image data sets together with the thumbnail images thereof;
   wherein the control circuit is configured to receive an input of the content of a print order for the image data sets; and
   wherein the control circuit generates an order information representing the content of the print order for the image data sets.

25. The image display and ordering apparatus of claim 24, wherein the image order processing comprises:

displaying a simple image of each registered image;

requesting print order information corresponding to each registered image; and sending the print order information to a remote processing center via at least one of a recording medium and a network connection.

26. A computer-readable recording storage medium for storing a program that causes a computer to execute a data management method, the method comprising:

displaying on a display a display icon corresponding to stored image data set;

displaying on the display an order icon corresponding to an image data set selected for ordering;

displaying on the display a simple image corresponding to an image in the stored image data set by opening the display icon;

registering the image for ordering with the order icon by dragging-and-dropping the simple image onto the order icon;

performing image order processing of the registered image or images;

displaying on the display, in the case where a plurality of sets of the image data have been registered with the data management unit, an order screen for all the image data sets together with the thumbnail images thereof;

receiving an input of the content of a print order for the image data sets; and generating order information representing the content of the print order for the image data sets.

27. The computer-readable recording storage medium for storing a program that causes a computer to execute a data management method of claim 26, wherein the image order processing comprises:

displaying a simple image of each registered image;

requesting print order information corresponding to each registered image; and sending the print order information to a remote processing center via at least one of a recording medium and a network connection.

28. The method of claim 1 wherein data selection and order content input can be carried out at one time.

* * * * *